United States Patent [19]
Svensson

[11] Patent Number: 5,820,161
[45] Date of Patent: Oct. 13, 1998

[54] APPARATUS AND METHOD FOR FILLING AN AIRBAG

[75] Inventor: Ovar Svensson, Taby, Sweden

[73] Assignee: AGA Aktiebolag, Lidingo, Sweden

[21] Appl. No.: 798,500

[22] Filed: Feb. 10, 1997

Related U.S. Application Data

[63] Continuation-in-part of Ser. No. 535,220, filed as PCT/SE94/00398, May 3, 1994, abandoned.

[30] Foreign Application Priority Data

Sep. 30, 1994 [WO] WIPO .......................... PCT/SE/00916

[51] Int. Cl.[6] .................................................... B60R 21/26
[52] U.S. Cl. ........................................... 280/737; 280/741
[58] Field of Search .................................... 280/737, 741, 280/743.1; 222/3

[56] References Cited

U.S. PATENT DOCUMENTS

| | | | |
|---|---|---|---|
| 4,268,065 | 5/1981 | Granig | 280/737 |
| 4,275,901 | 6/1981 | Okada | 280/737 |
| 5,348,344 | 9/1994 | Blumenthal et al. | 280/737 |
| 5,501,259 | 3/1996 | Palm | 280/743.1 |
| 5,642,902 | 7/1997 | France | 280/737 |

FOREIGN PATENT DOCUMENTS 2225291  5/1990  United Kingdom ................ 280/743.1

*Primary Examiner*—Paul N. Dickson
*Attorney, Agent, or Firm*—Pearne, Gordon, McCoy & Granger LLP

[57] ABSTRACT

The present invention relates to a system for filling an empty flexible container such as an airbag with gas essentially instantaneously when the system or vehicle utilizing such system is subjected to sufficient deceleration forces, such as experienced during a collision. The gas-filled container functions as a force absorbing cushion which protects occupants in the vehicle against injuries. The system includes pressure vessels filled with gas under high pressure, one or more conduits connecting the pressure vessels with the flexible container, provisions for opening the connection between the pressure vessels and the flexible container upon sensing retardation or deceleration forces that exceed some threshold value, a container holding or mixing device, and a retardation meter. The pressure vessels are each sealed by a closure device and each has a respective connection conduit which joins the pressure vessels to the flexible container. One pressure vessel contains oxygen and an inert gas. The other pressure vessel contains inert gas and hydrogen. The inert gas is helium, argon and/or nitrogen.

31 Claims, 2 Drawing Sheets

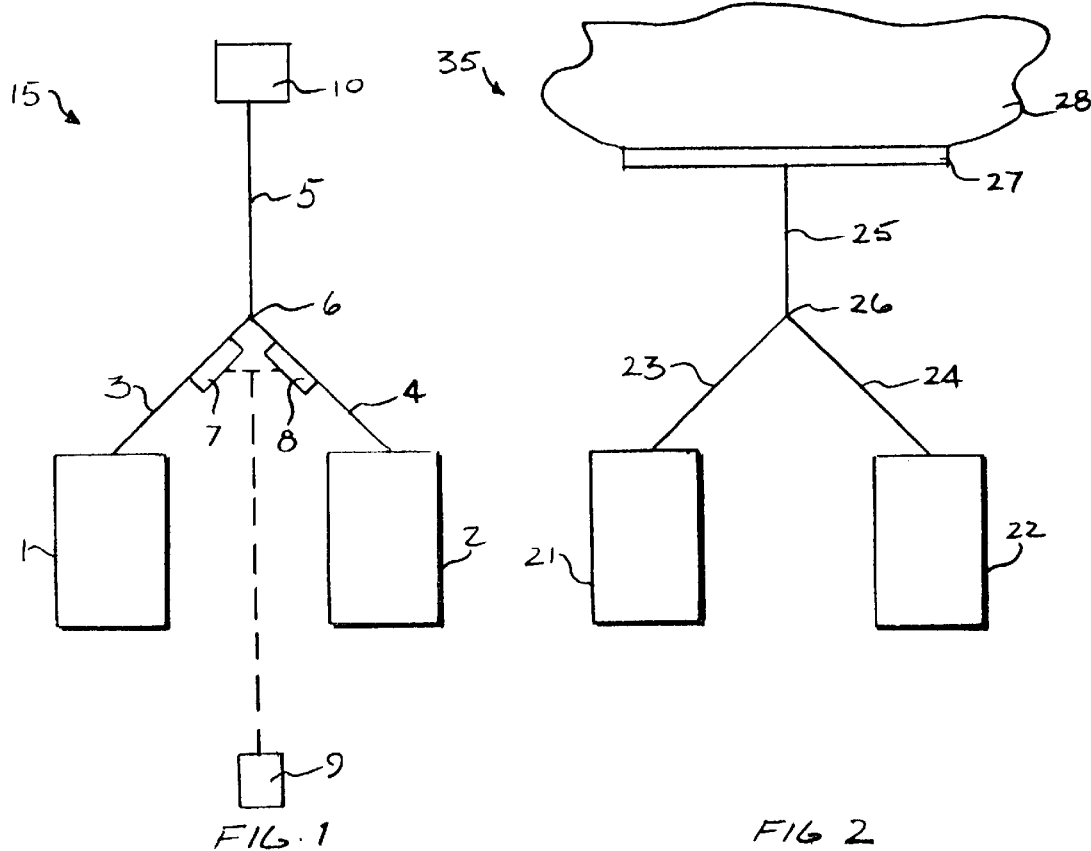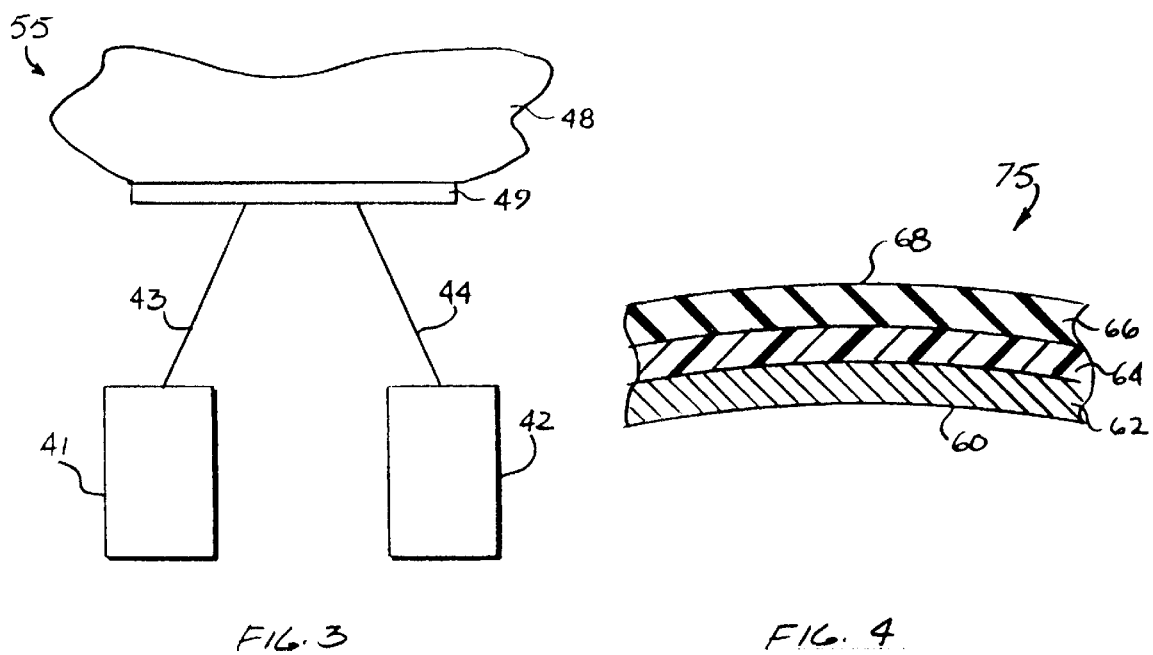

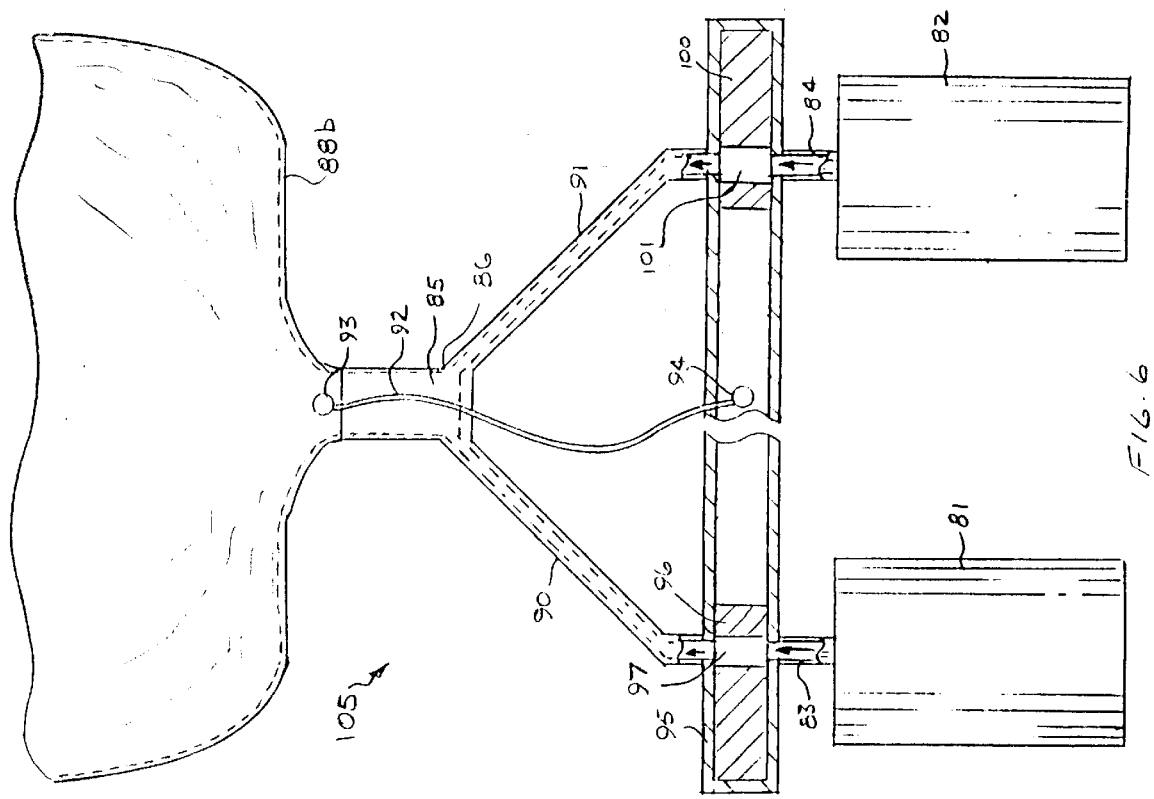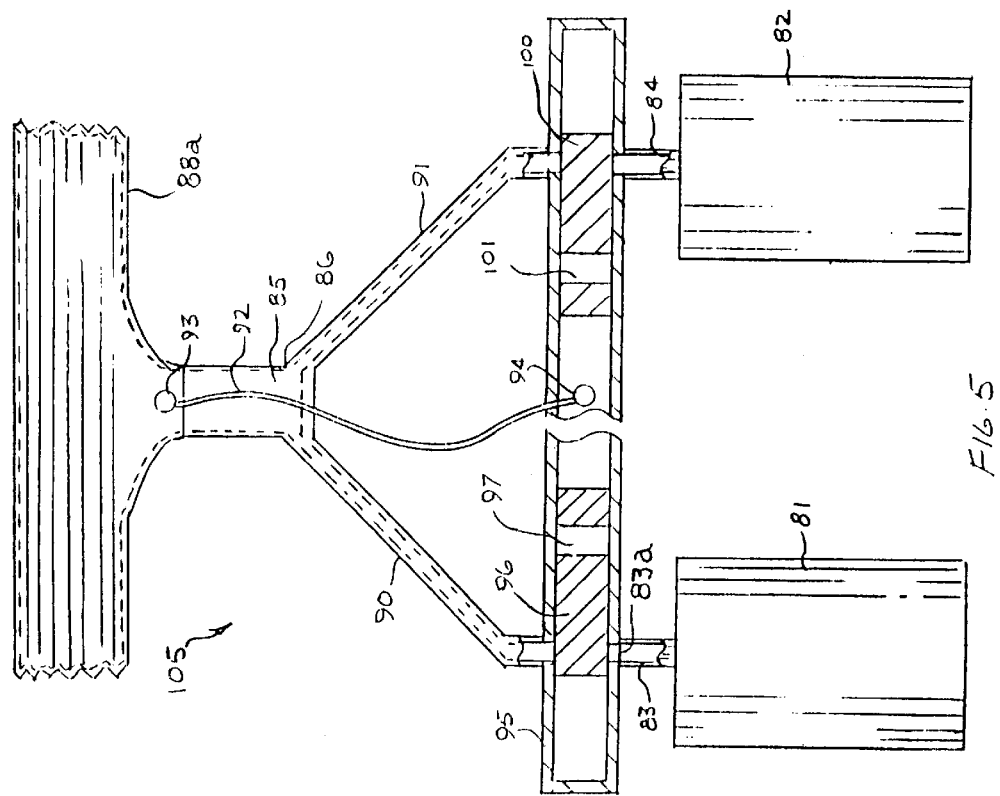

APPARATUS AND METHOD FOR FILLING AN AIRBAG

CROSS-REFERENCE TO RELATED APPLICATIONS

The present application is a continuation-in-part application of U.S. application Ser. No. 08/535,220 filed Nov. 16, 1995 (now abandoned) from PCT application No. PCT/SE94/00398 (published as WO 94/26562) filed on May 3, 1994, claiming priority from SE 9301730-9 filed May 19, 1993; and PCT application No. PCT/SE94/00916 (published as WO 96/10496) filed Sep. 30, 1994.

FIELD OF THE INVENTION

The present invention relates to an apparatus for inflating an empty flexible container, such as an airbag, incorporated in the passenger compartment of an automobile. The container is inflated with gas immediately, or substantially so, upon application of significant retardation or deceleration forces to the automobile. The container prevents or significantly reduces injury, otherwise suffered by a person seated in the vehicle in the event of a collision.

BACKGROUND OF THE INVENTION

Cars are typically equipped with airbags as an alternative or supplement to safety belts. In the event of a collision, the airbags are inflated extremely quickly in front of the driver or passengers, to protect the driver or passengers from injury that they might otherwise suffer if thrown forwards against the steering wheel or the instrument panel of the vehicle.

At present, automotive vehicles are not fitted with airbags for backseat passengers. One reason for this is that very large bags would be needed for protection of those in the rear vehicle seat. There are numerous problems associated with inflating such large airbags, such as achieving sufficient inflation within the requisite time period.

In the event of a head-on collision, or any type of collision in which the vehicle is brought to an abrupt halt, it must be possible to inflate the bag with gas before the driver or passengers, who continue to move at the original speed of the vehicle, strike the back of the front seat or are thrown against the steering wheel and/or the instrument panel.

In order to obtain effective protection, it is estimated that the airbag or like cushion must be inflated within one-hundredth of a second. Assuming that a car is traveling at a speed of 110 km/hour when a collision occurs, a person seated in the car will travel through a distance of about 0.3 meter in relation to the ground within this period of time. Since the actual body of the vehicle will not stop immediately, by virtue of the front of the vehicle buckling inwards through a distance of one or more decimeters, the driver of the vehicle or passengers carried therein will move forwards through a distance of from about one to two decimeters relative to the vehicle body in the space of 0.01 seconds. Accordingly, the cushion or bag must inflate within this time period and therewith prevent the driver of passengers being thrown onto the driving wheel, the instrument panel, or the backrest of the front seat.

When a gas expands in the absence of an exchange of energy (isoenthalpic expansion), as during inflation of the bags described herein, the temperature will normally fall in accordance with the effect. In the case of air or nitrogen, which is permitted to expand from 400 to 2 bars, the temperature of the gas will decrease by about 70° to 100° C. As will be appreciated, the significantly reduced temperature of the gas severely decreases the volume of the bag or cushion upon inflation. When the gas is stored in high pressure containers, as in the case with airbags, it is necessary to either supply corresponding heat to the gas to obtain the volume that would be obtained at room temperature, or the pressure container must be filled with about 30% more gas to compensate for this effect.

In addition to temperature reduction, it must be remembered that air, nitrogen and other gases have a compressibility factor of about 1.2 at 400 bars, which must also be taken into account when dimensioning the bag or flexible container. Such a compressibility factor requires that the pressure or the volume must be increased to a corresponding degree in comparison with what would have been the case for an ideal gas.

Another problem encountered with the use of heavy gases for airbag inflation is that the outflow velocity of the gas is relatively low, since the velocity is a function of both molecular weight and temperature.

DE-A-4 231 356 discloses an apparatus comprising two gas receptacles and a combustion chamber provided upstream of an inflatable flexible container. The apparatus includes an ignition means for initiating the combustion of the gases from the receptacles in the combustion chamber. The combustion chamber is generally separated from the flexible container by means of an end wall in the form of a burst disk. The disk bursts when the pressure in the combustion chamber reaches a predetermined level. In another embodiment, the burst disk is replaced by a flow control orifice that controls the gas flow rate to the inflatable container and the pressure in the combustion chamber. Thus, no free flow of gas from the receptacles to the inflatable container is possible.

DE-A-2 501 602 discloses another type of apparatus for filling a vehicle mounted empty flexible container with gas when the container is subjected to powerful retardation forces. The apparatus includes a pressure receptacle which is filled with pressurized gas to be expanded for filling the flexible container upon retardation, and an ignition chamber comprising a medium to be ignited for raising the temperature of the expanding gas during filling of the flexible container.

Although satisfactory in some respects, known airbag inflation systems exhibit many of the previously noted disadvantages. Thus, there is a need for an inflation system that overcomes many if not all of these drawbacks, and that can be readily and economically incorporated into a vehicle.

SUMMARY OF THE INVENTION

The present invention provides an apparatus for filling a vehicle mounted flexible container with gas essentially instantaneously when the container is subjected to powerful retardation forces. The gas-filled container functions as a force absorbing cushion which protects occupants in the vehicle against injuries. The apparatus includes a first pressure receptacle which is filled with oxygen and an inert gas under high pressure, and a second pressure receptacle which is filled with hydrogen and an inert gas under high pressure. The inert gas in the first pressure receptacle is helium, argon and/or nitrogen. The inert gas in the second pressure receptacle is the same or a different mixture of helium, argon, and/or nitrogen. The apparatus includes a closure device in association with each of the first and second receptacles and respective connection conduits that join the receptacles to the flexible container. The apparatus may further include a container-holding device or mixing chamber, a retardation meter, and an ignition device.

Moreover, the present invention provides a method of filling an empty flexible container with gas essentially instantaneously when subjected to powerful retardation forces, wherein the gas-filled container serves as a force absorbing cushion for protection against injury. The method comprises the use of an apparatus which includes two pressure receptacles which are sealed with the aid of a closure means and which contain gas under high pressure. The apparatus further includes a first conduit which extends from one pressure receptacle to the flexible container or to a chamber providing access thereto, a second conduit which extends from the other pressure receptacle to the container or chamber, and an ignition device. One pressure receptacle contains oxygen and an inert gas and the other pressure receptacle contains hydrogen and an inert gas. The inert gas in one of the pressure receptacles is helium, argon and/or nitrogen. The inert gas in the other pressure receptacle is the same or a different mixture of helium, argon, and/or nitrogen. The method further comprises passing the gases from the receptacles into the flexible container, and igniting the resulting gas mixture.

BRIEF DESCRIPTION OF THE DRAWINGS

FIG. 1 schematically illustrates a preferred embodiment inflation system comprising two gas containers that are connected to a conduit in connection with an empty gas bag;

FIG. 2 schematically illustrates another preferred embodiment inflation system comprising two gas containers connected to a conduit which in turn is connected to a partially filled gas cushion;

FIG. 3 schematically illustrates another preferred embodiment inflation system in which each of the two gas containers is connected to the gas cushion by a separate conduit;

FIG. 4 is a cross-section of a wall of a preferred embodiment gas bag;

FIG. 5 schematically illustrates yet another preferred embodiment inflation system comprising two gas containers connected to a gas cushion via a sliding duct assembly; and FIG. 6 illustrates the system of FIG. 5 upon activation and inflation of the gas cushion.

DETAILED DESCRIPTION OF THE PREFERRED EMBODIMENTS

FIG. 1 illustrates a preferred embodiment inflation apparatus 15 comprising a main conduit 5 extending from an empty gas bag 10. The end of the main conduit 5 which is opposite the gas bag 10 branches into two connection conduits 3 and 4, via a branch 6. Each of the connection conduits 3 and 4 is connected to a respective compressed-gas container 1 and 2. The gas containers 1 and 2 are closed by means of burster plates 7 and 8 which open simultaneously when the vehicle is subjected to significant retardation or deceleration forces, such as experienced during a collision. A retardation meter 9 senses vehicle deceleration or retardation and actuates the burster plates 7 and 8 to thereby enable the flow of gas from the containers 1 and 2 to the gas bag 10. Other types of closure devices may be utilized instead of the burster plates 7 and 8, such as conventional flow controllers. The containers 1 and 2, contain collectively, the requisite volume of gas to sufficiently inflate the gas bag 10. Although the terms "flexible container", "airbag", "air cushion", "gas bag", "gas cushion", or "cushion" are used herein, it is to be understood that such terms are used interchangeably and are not intended to limit the bag, cushion, or flexible container to only be filled with "air" or a single "gas".

Referring to FIG. 1, the gas container 1 contains oxygen and is preferably filled with helium and at most 50% by volume of another inert gas, for instance argon and/or nitrogen. The amount of oxygen present is preferably between 2.5 and 20% by volume of the total volume of gas in the containers 1 and 2. The other gas container 2 contains hydrogen and is preferably also filled with helium and at most 50% by volume of another inert gas, for instance argon and/or nitrogen. The preferred amount of hydrogen ranges from 3 to 15% by volume of the total gas volume in the containers 1 and 2. The containers 1 and 2 preferably contain the same inert gas or inert gas mixture. The most preferred inert gas is helium, constituting almost all of the inert gas present in the containers 1 and 2.

The retardation meter 9, included in the apparatus 15, senses deceleration of the vehicle in which the meter 9 is installed. The retardation meter 9 preferably comprises one or more output provisions that generate one or more signals, such as electrical control signals, indicating that sufficient deceleration or retardation forces have been sensed by the meter 9. Such forces are representative of an abrupt halt or collision involving the vehicle. The retardation meter 9 may also comprise an adjustment provision for varying the amount of deceleration force that must be sensed by the meter 9, e.g. a threshold level, in order to generate one or more output signals.

In the event the retardation meter 9 senses a sufficient retardation or deceleration force and so indicating vehicle collision, the burster plates 7 and 8 on both containers 1 and 2 are activated, i.e. ruptured or burst. The plates 7 and 8 are preferably activated by the signal output provisions of the retardation meter 9. As a result, the gas contained in the two containers 1 and 2 flows into the main conduit 5. The burster plates 7 and 8 can be of known construction and may include an explosive charge to effect their rupture. The explosion generated to burst the burster plates 7 and 8 ignites the oxygen-hydrogen mixture resulting in a chemical reaction that forms water. As a result of this reaction, the temperature of the gases is raised considerably, thereby adequately compensating for the cooling effect caused by the free expansion of the inert gas, such as helium, nitrogen and/or argon. This effectively reduces the volume of gas otherwise required to adequately inflate the gas bag 10.

Because it is not recommended to store an oxygen-hydrogen mixture in one and the same container for safety reasons, these gases are held in separate containers. The containers are opened simultaneously upon sufficient deceleration of the vehicle, and the gases, i.e. oxygen and hydrogen, combine before they reach the gas bag 10.

It is extremely important that the pressurized containers such as the containers 1 and 2, used for filling collision-activated airbags such as the gas bag 10, do not leak and will remain under the necessary pressure for many years after being filled. Since highly sensitive helium leakage detectors are available, it is convenient to use helium as a constituent of the gas for inflating the gas bag 10.

FIG. 2 illustrates another preferred embodiment inflation apparatus 35 comprising a main conduit 25 which extends from a gas cushion 28, which is shown partially filled. The gas cushion 28 is mounted in a holder device 27. The end of the main conduit 25 distal from the gas cushion 28 branches at a branch 26 into two connection conduits 23 and 24, each of which is connected to a respective compressed gas container 21 and 22. The outlets of the gas containers 21 and 22 are provided with rupture provisions, for instance in the form of a burster plate or disc, which may be ruptured or otherwise opened to provide instantaneous free passage of the gas from containers 21 and 22. This free passage of gas occurs simultaneously, or nearly so, in the event retardation or collision forces powerful enough to burst the plate or disc, are applied to the apparatus 35. The containers 21 and 22, together, contain the volume of gas needed to fill the gas cushion 28. The inflation apparatus 35 may further comprise a retardation meter in communication with the closure devices as described in conjunction with the inflation apparatus 15 illustrated in FIG. 1. Other types of closure devices or rupture provisions may be utilized.

The gas cushion 28 is secured in the holder 27. An ignition device, which may be a spark generating device, is mounted in the main conduit 25 adjacent an outlet orifice proximate the gas cushion 28, or in the vicinity of the outlet orifice of the holder 27, or near the gas containers 21 and 22 adjacent the opening of the conduit 25. The ignition device may function as an opening device that activates the rupture provisions or other closure device to enable gas to flow from the containers 21 and 22 to the cushion 28. In such a configuration, it is preferred to use burster plates that are ruptured by an explosive charge. Activation of the charge can be effected by the ignition device.

The first container 21 contains oxygen and is preferably filled with an inert gas, for instance argon, helium, nitrogen or a mixture of two or more of these gases. The amount of oxygen in the container 21 is preferably between 2.5 and 20% by volume of the total volume of gas in the two containers 21 and 22. The other container 22 contains hydrogen and is also preferably filled with inert gas. The amount of hydrogen present in the container 22 is preferably 3 to 15% by volume of the total volume of gas in the two containers 21 and 22. The containers 21 and 22 preferably contain the same inert gas or gas mixture. Helium is the most preferred inert gas.

When the vehicle is subjected to powerful retardation or deceleration forces, the weakening at the outlet of the gas containers, i.e. the rupture provisions, which in the preferred embodiment inflation apparatus 35 are bursting plates, will rupture and therewith create an opening through which gas is able to flow to the main conduit 25 from both containers 21 and 22. When a given predetermined amount of gas has flowed into the flexible cushion 28, the ignition device will generate a spark which causes the oxygen-hydrogen mixture to explode and therewith react to form water. The temperature is raised considerably by this reaction, which more than compensates for the cooling effect resulting from the free expansion of the inert gas such as helium, nitrogen, and/or argon. This enables the amount of gas required to fill the cushion 28 to be significantly reduced.

As previously noted, since it is not safe to store an oxygen-hydrogen mixture in one and the same container, these gases are stored separately in containers 21 and 22. The containers are opened simultaneously so that the gases will mix, or at least partially mix, prior to reaching the cushion 28.

As was also previously noted, it is extremely important to ensure that the pressurized containers 21 and 22 used to fill the gas cushion 28 in the event of a collision, do not leak and that they will remain pressurized at the requisite pressure for many years after being filled. Because highly sensitive helium-leakage testing devices are commercially available, it is appropriate to include helium as a constituent of the gas used in this regard.

FIG. 3 illustrates another preferred embodiment inflation apparatus 55 comprising two gas containers 41 and 42 and separate conduits 43 and 44 extending from the respective containers 41 and 42. The gas containers 41 and 42 preferably contain the oxygen and hydrogen and inert gas mixtures previously described in conjunction with the inflation apparatuses 15 and 35. The conduits 43 and 44 are connected to a gas cushion 48 through a mixer 49, which may also function as a holding device similar to the previously described holder device 27. The inflation apparatus 55 may further comprise an ignition device, a retardation meter, and rupture provisions or closure devices as utilized in the previously described apparatus 35. The mixer 49 includes a mixing chamber having a plurality of openings that connect or provide communication with the gas cushion 48. The mixer 49 is configured to present minimal resistance to the flow of gas to the gas cushion 48. In this embodiment, the ignition device is preferably mounted in the mixing chamber of the mixer 49.

In this preferred embodiment shown in FIG. 3, the gas mixture is ignited when a certain proportion of the total gas volume of the two gas containers 41 and 42 has passed into the gas cushion 48. This ignition may be caused to occur after a predetermined time period has lapsed after opening the two gas containers 41 and 42. The rate at which the gas cushion 48 is filled will decrease with time, because the pressure drop in the gas containers 41 and 42 will not permit all of the available gas volume to fill the gas cushion 48.

Ignition of the gas mixture results in a marked and rapid increase in the temperature of the entire volume of gas in the gas cushion 48, which, in turn, results in a significant increase in the volume of gas in the gas cushion 48. The mixture is ignited when at least 10% of the total volume of gas in the containers 41 and 42 has passed through the mixer 49, the volumetric capacity of which is normally small in relation to the volumetric capacity of the gas cushion 48. Preferably, the gas mixture is ignited when at least 30% of the total gas volume has reached the gas cushion 48. It is most preferred that at least 75% of the total volume of gas in the containers 41 and 42 will have passed into the flexible gas cushion 48 before the gas mixture is ignited. According to one particularly most preferred embodiment, the gas cushion 48 will contain from 80 to 90% of the total gas volume when the gas mixture is ignited.

FIG. 5 illustrates yet another preferred embodiment inflation apparatus 105 comprising two gas containers 81 and 82, a flexible and inflatable gas cushion 88, a conduit assembly described in greater detail below, and a sliding duct assembly 95. The gas containers 81 and 82 preferably contain the oxygen, hydrogen, and inert gas mixtures previously described in conjunction with the inflation apparatuses 15, 35, and 55. The gas container 81 is connected to the sliding duct assembly 95 by a flow port 83. Similarly, the gas container 82 is connected to the sliding duct assembly 95 by a flow port 84. The conduit assembly generally comprises a first conduit member 85 extending from the opening of the gas cushion 88 to a branch 86. The conduit assembly further comprises a first conduit leg 90 and a second conduit leg 91 as shown in FIG. 5. Each of the legs 90 and 91 are connected to the sliding duct assembly 95 and the branch 86.

The sliding duct assembly 95 is in many respects similar to the previously described closure devices or rupture provisions. The sliding duct assembly 95 provides apertures through its walls for connection to the noted conduit legs 90 and 91, and flow ports 83 and 84. The sliding duct assembly 95 comprises a receiving chamber that houses a first slidable member 96 disposed between the first conduit leg 90 and the flow port 83. The sliding duct assembly 95 further comprises a second slidable member 100 disposed between the second conduit leg 91 and the flow port 84. The second member 100 is also enclosed within the receiving chamber of the sliding duct assembly 95. Each slidable member 96 and 100 is slidable between one of two positions. In a first closed position shown in FIG. 5, the slidable member 96 or 100 blocks flow of gas from a gas container, such as container 81 or 82, to a respective conduit leg 90 or 91. In a second state shown in FIG. 6, each slidable member 96 or 100 is slid within the sliding duct assembly 95 to an open position such that an aperture defined within the slidable member is aligned with the flow port 83 or 84 of the gas container and the conduit leg 90 or 91. Specifically, the slidable member 96 defines an aperture 97 extending through the thickness of the member 96 as shown in FIGS. 5 and 6. When the member 96 is moved to its open position as depicted in FIG. 6, the aperture 97 is aligned with the conduit leg 90 and the flow port 83, thereby enabling gas from the container 81 to flow therethrough. Similarly, the slidable member 100 also defines an aperture 101 through which gas contained in the gas container 82 can flow through the flow port 84 and into the conduit leg 91 when the slidable member 100 is moved to its open position.

Most preferably, the apertures 97 and 101 provided in the slidable members 96 and 100 are defined at a location along the length of each member a particular distance such that when each member is slid to its open position, the apertures 97 and 101 are aligned with the openings, i.e. conduits and flow ports, on either side of the member. Referring to FIG. 5, when the slidable member 96 is slid to its open position, i.e. the member 96 is positioned to the left until the left end of the member 96 contacts or otherwise abuts the left end wall of the duct 95, the aperture 97 is generally aligned between the flow port 83 and the opening for the conduit leg 90. This alignment is shown in FIG. 6. Likewise, the slidable member 100, when moved to its open position as shown in FIG. 6, is placed in contact with, or generally abutted against the right end wall of the duct 95.

It is preferred to utilize a thin, rupturable sealing member disposed within or at the distal end of the flow ports. Such sealing members minimize leakage of the contents of a gas container, and also guard against the entry of contaminants or other unwanted agents into a gas container. Most preferably, the sealing member is a thin metallic foil that when exposed to the pressure of the interior of a gas container, ruptures to allow the gas or gases within the container to escape. The sealing member is preferably disposed adjacent a slidable member so that the membrane only ruptures when the slidable member moves into its open position. An example of a preferred rupturable sealing member is member 83a shown in FIG. 5. Upon activation of the apparatus 105, as shown in FIG. 6, the member 83a is ruptured to allow gas to flow from the container 81 through the flow port 83 and into the aperture 97 of the slidable member 96. Although only one sealing member is shown in FIG. 5, i.e. member 83a, it is to be understood that the present invention includes the use of one or more rupturable sealing members disposed within, or at the distal end of, a flow port.

The sliding duct assembly 95 further comprises a priming wire 92 extending between the gas cushion 88 and the medial region of the duct 95. An explosive charge 94 is preferably positioned within the central medial of the duct 95 as shown in FIG. 5. One end of the priming wire 92 is positioned proximate the medial region of the duct 95, and preferably in electrical association with the explosive charge 94, such that when the charge 94 is ignited, the wire 92 will also be ignited. The other end of the priming wire 92 is positioned near the opening of the gas cushion 88, and most preferably at the outlet of the conduit 85 such as at location 93.

Upon sensing sufficient retardation or deceleration forces, as described in conjunction with the apparatuses 15, 35, and 55, the explosive charge 94 is ignited. A deceleration meter, as previously described, may be utilized to ignite the explosive charge 94. This ignition also ignites the priming wire 92. The explosive forces resulting from activation of the charge 94 cause the slidable members 96 and 100 to each move toward its respective open position. In this open configuration, each aperture 97 and 101 is aligned with the respective openings of the gas containers 81 and 82 via the flow ports 83 and 84. Accordingly, the gas containers 81 and 82 are opened at exactly the same time. Hydrogen contained in a gas mixture, such as within the gas container 81, will flow through the port 83, through the aperture 97 in the slidable member 96, through the conduit branch 90 and the branch 86, into the conduit 85 and into the gas cushion 88. Similarly, oxygen in the other gas mixture, such as in the gas container 82, will flow through the port 84, through the aperture 101 in the slidable member 100, through the second conduit leg 91, through the branch 86, into the conduit 85, and into the gas cushion 88. The gases will mix when they flow through the branch 86, the conduit 85, and the gas cushion 88.

The burning of the priming wire 92 ignites the hydrogen and oxygen gas mixture within the gas cushion 88. As will be appreciated, there exists some finite time period within which a certain amount of gas enters the gas cushion 88 after explosion of the charge 94. This time period depends upon the explosion time, rate of travel of the members 96 and 100, the initial pressure of the gas mixtures in the containers 81 and 82, as well as the dimensions of the openings utilized in the flow ports 83, 84, the apertures 97, 101, and the conduits 90, 91, 86, and 85. Once having determined or estimated this time period, the length of the priming wire 92 is determined based upon its burn rate so that the time period associated with the burning of the wire 92 is matched to the time period allowing for entry of the desired amount of gas into the gas cushion 88.

In all of the previously described embodiments, it is particularly preferred that the gas containers 1, 2, 21, 22, 41, 42, 81, and 82 have certain features as follows. The openings or outlet ports of the containers are of a size or diameter such that a proper rate of pressure increase and inflation duration of the bag or cushion is obtained. The rate of pressure increase in a bag undergoing inflation should be sufficient to provide a force absorbing cushion for vehicle occupants, but not be too great such that the bag ruptures. Similarly, the inflation duration should be such that the bag is sufficiently inflated during the time period within which the occupants may strike the passenger compartment. The size or diameter of the gas container opening is also dependent upon the volumetric capacity of the bag or cushion to be inflated. It is to be understood that the various aspects of each of the previously described embodiments may, where appropriate, be combined in one or more inflation systems.

Furthermore, it is preferred that all of the previously described gas bag 10 or gas cushions 28, 48, and 88 comprise an inner layer or liner of heat reflecting material. It is most preferred that the bag 10 or cushions 28, 48, and 88 also comprise a layer of a material having a relatively low thermal conductivity and a relatively low thermal capacity. FIG. 4 illustrates a cross-section of a wall of any of the bag 10 or cushions 28, 48, and 88. This wall, designated as 75, preferably comprises an inner layer 62 of heat reflecting material. The layer 62 provides an inwardly facing and heat reflecting surface 60. Adjacent the layer 62, is a medial layer 64 of a material having a relatively low thermal conductivity and low thermal capacity. The outer layer 66 of the wall 75 is preferably a force absorbing material adapted for use in airbags. The outer layer 66 provides an outer surface 68. The layer 62 of heat reflecting material can be formed from a wide array of materials such as, but limited to, aluminum or other metal foils. The layer 64 of low thermal conductivity and capacity material can be formed from an assortment of materials including, but not limited to, polyester materials such as MYLAR, and polystyrene. The outer layer 66 can be formed from known materials typically employed in airbag construction.

In all of the foregoing embodiments, ignition of the gas contained in, or entering, the bag or cushion can be performed directly in the bag or cushion. As a result, expansion of the ignited gas acts directly upon the bag or cushion. No energy losses occur from transferring ignited gas from a separate combustion chamber through one or more conduits, to the bag or cushion. Moreover, the energy released as a result of the combustion reaction heats the gas mixture and compensates for the previously described cooling effect associated with gas expansion.

All of the noted inflation systems provide a significant advance in the art of inflatable safety restraint systems and force absorbing airbags or gas cushions. The inflation systems described herein can be used for relatively rapid bag or cushion inflation. Accordingly, the systems can be utilized for inflating relatively large bags, such as for rear seat application. The inflation systems enable virtually unrestricted free flow of gases into the bag or cushion during inflation. Moreover, the configuration of the system, choice of gas mixtures, and combustion of the gases overcomes the prior art problems of deficient inflation.

While the foregoing details are what is felt to be the preferred embodiments of the present invention, no material limitations to the scope of the claimed invention are intended. Further, features and design alternatives that would be obvious to one of ordinary skill in the art are considered to be incorporated herein. The scope of the invention is set forth and particularly described in the claims herein below.

What is claimed is:

1. Apparatus for a vehicle, said apparatus comprising:
   a flexible container;
   a first receptacle containing a first gas mixture comprising oxygen and one or more inert gases;
   a second receptacle containing a second gas mixture comprising hydrogen and one or more inert gases;
   a first conduit providing a flow path from said first receptacle to said flexible container;
   a second conduit providing a flow path from said second receptacle to said flexible container;
   at least one closure device enabling flow of gas from said first and second receptacles to said flexible container, said closure device comprising a sliding duct assembly having:
      a receiving chamber having a first end wall, a second end wall, and a housing extending between said first and second end walls, said housing defining at least one opening in communication with said first receptacle and at least one opening in communication with said second receptacle;
      a first slidable member defining a first aperture; and
      a second slidable member defining a second aperture;
      an explosive charge for positioning said first slidable member and said second slidable member; and
      a priming wire having a first end in electrical association with said explosive charge and a second end in communication with the interior of said flexible container;
   wherein upon actuation of said closure device, said first slidable member is positioned so that said first aperture is aligned with said at least one opening defined in said housing and in communication with said first receptacle, and said second slidable member is positioned so that said second aperture is aligned with said at least one opening defined in said housing and in communication with said second receptacle; and
   a deceleration sensor in communication with said closure device wherein upon sensing sufficient deceleration, said sensor actuates said closure device to enable flow of gas from said first and second receptacles to said flexible container.

2. The apparatus of claim 1 wherein said inert gas in said first gas mixture is selected from the group consisting of helium, argon, nitrogen, and combinations thereof.

3. The apparatus of claim 2 wherein said first gas mixture comprises oxygen, helium, and up to 50% by volume argon, nitrogen, and combinations thereof.

4. The apparatus of claim 1 wherein said inert gas in said second gas mixture is selected from the group consisting of helium, argon, nitrogen, and combinations thereof.

5. The apparatus of claim 4 wherein said second gas mixture comprises hydrogen, helium, and up to 50% by volume argon, nitrogen, and combinations thereof.

6. The apparatus of claim 1 wherein said second gas mixture comprises hydrogen in an amount corresponding to 3 to 15% by volume of the total gas volume in said first receptacle and said second receptacle.

7. The apparatus of claim 1 wherein said first gas mixture comprises oxygen in an amount corresponding to 2.5 to 20% by volume of the total gas volume in said first receptacle and said second receptacle.

8. The apparatus of claim 1 further comprising:
   a common conduit disposed between and providing a flow path between said first conduit, said second conduit, and said flexible container.

9. The apparatus of claim 1 wherein the priming wire ignites the gas from said first and second receptacles.

10. The apparatus of claim 1 wherein said flexible container includes a multilayer wall, said wall comprising:
    an inner layer comprising a heat reflecting material;
    a medial layer comprising a material having a relatively low thermal conductivity and a relatively low thermal capacity; and
    an outer layer comprising a force absorbing material.

11. The apparatus of claim 10 wherein said heat reflecting material is aluminum.

12. The apparatus of claim 10 wherein said material utilized in said medial layer is selected from the group consisting of polystyrene and polyester.

13. An arrangement for inflating a flexible and expandable container with gas essentially instantaneously upon application of sufficient retardation force applied to said arrangement, wherein said container upon inflation forms an injury reducing, force absorbing container, said arrangement comprising:
    a first vessel comprising oxygen, helium, and up to 50% by volume of at least one inert gas selected from the group consisting of argon, nitrogen, and combinations thereof;

a second vessel comprising hydrogen, helium, and up to 50% by volume of at least one inert gas selected from the group consisting of argon, nitrogen, and combinations thereof;

first and second connecting conduits respectively providing communication to said first and second vessels;

a main conduit for providing communication to said container;

a branch providing communication between said first connecting conduit, said second connecting conduit, and said main conduit;

a mixing chamber disposed between said container and said main conduit;

a retardation sensor for sensing retardation forces applied to said arrangement and having provisions for generating an output signal upon sensing retardation forces that exceed a threshold value;

rupture provisions in communication with said output signal of said retardation sensor, said rupture provisions for providing flow connections between said first and said second vessels and said container upon receiving said output signal; and an ignition device for igniting gas from said first and second vessels, said ignition device being disposed in said container.

14. The arrangement according to claim 13 wherein the volume of oxygen present in said first vessel corresponds to 2.5 to 20% by volume of the total volume of gas present in said first vessel and said second vessel.

15. The arrangement according to claim 13 wherein the amount of hydrogen present in said second vessel corresponds to 3 to 15% by volume of the total volume of gas present in said first vessel and said second vessel.

16. The arrangement of claim 13 wherein said rupture provisions include a sliding duct assembly.

17. The arrangement of claim 16 wherein said sliding duct assembly includes:

a receiving chamber having a first end wall, a second end wall, and a housing extending therebetween, said housing defining a plurality of openings for transferring gas from said first vessel, and a plurality of openings for transferring gas from said second vessel;

a first slidable member defining a first aperture, said first slidable member disposed within said receiving chamber and proximate said first end wall; and a second slidable member defining a second aperture, said second slidable member disposed within said receiving chamber and proximate said second end wall.

18. The arrangement of claim 17 wherein said sliding duct assembly further includes:

an explosive charge disposed within said receiving chamber and disposed between said first and second slidable members.

19. The arrangement of claim 18 wherein said sliding duct assembly further includes:

a priming wire in electrical association with said explosive charge and said provisions of said retardation meter.

20. The arrangement of claim 19 wherein said priming wire has a first end in said electrical association with said explosive charge and a second end in communication with said container.

21. A method of filling an empty flexible container with gas essentially instantaneously when subjected to powerful retardation forces, wherein the gas-filled container functions as a force absorbing cushion for protection against injury, wherein the method comprises:

providing an apparatus which includes a first and a second pressure receptacle which are sealed with the aid of a closure means and which contain gas under high pressure, a first conduit which extends from said first receptacle to said container, a second conduit which extends from said second receptacle to said container, and an ignition device, wherein said first receptacle comprises hydrogen and one or more inert gases selected from the group consisting of helium, argon, and nitrogen, and said second receptacle comprises oxygen and one or more inert gases selected from the group consisting of helium, argon, and nitrogen;

passing said gases from said first and said second receptacle into said container; and igniting said gases when at least 10% of the total gas volume in said first and said second receptacle has passed into said container.

22. The method according to claim 27, whereby said gases are ignited when at least 30% of the total gas volume in said first and said second receptacle has passed into said container.

23. The method according to claim 21 whereby said gases are ignited when at least 75% of the total gas volume in said first and said second receptacle has passed into said container.

24. A method according to claim 21 whereby said gases are ignited when at least 90% of the total gas volume in said first and second receptacle has passed into said container.

25. An arrangement for inflating a flexible and expandable container with gas essentially instantaneously upon application of sufficient retardation force applied to said arrangement, wherein said container upon inflation forms an injury reducing, force absorbing container, said arrangement comprising:

a first vessel comprising oxygen, helium, and up to 50% by volume of at least one inert gas selected from the group consisting of argon, nitrogen, and combinations thereof;

a second vessel comprising hydrogen, helium, and up to 50% by volume of at least one inert gas selected from the group consisting of argon, nitrogen, and combinations thereof;

at least one conduit for connecting said first and second vessels to said container;

a retardation sensor for sensing retardation forces applied to said arrangement and having provisions for generating an output signal upon sensing retardation forces that exceed a threshold value; and rupture provisions in communication with said output signal of said retardation sensor, said rupture provisions for providing flow connections between said first and said second vessels and said container upon receiving said output signal, said rupture provisions comprising a sliding duct assembly having:

a receiving chamber having a first end wall, a second end wall, and a housing extending between said first and second end walls, said housing defining a plurality of openings for transferring gas from said first vessel, and a plurality of openings for transferring gas from said second vessel;

a first slidable member defining a first aperture, said first slidable member disposed within said receiving chamber and proximate said first end wall;

a second slidable member defining a second aperture, said second slidable member disposed within said receiving chamber and proximate said second end wall;

an explosive charge disposed within said receiving chamber and disposed between said first and second slidable members; and a priming wire in electrical association with said explosive charge and said provisions of said retardation sensor.

26. The arrangement of claim 25 wherein said priming wire has a first end in said electrical association with said explosive charge and a second end in communication with said container.

27. Apparatus for filling a vehicle-mounted flexible container with gas, said apparatus comprising:

a first receptacle containing a first gas mixture comprising oxygen and an inert gas;

a second receptacle containing a second gas mixture comprising hydrogen and an inert gas;

a main conduit for connection to the flexible container;

a first conduit connected between the first receptacle and the main conduit;

a second conduit connected between the second receptacle and the main conduit;

a closure assembly having a closed state, wherein the closure assembly prevents the first and second gas mixtures from flowing through the first and second conduits, and an open state, wherein the closure assembly permits the first and second gas mixtures to flow through the first and second conduits and into the main conduit;

an explosive device that, when ignited, places the closure assembly in the open state and ignites the first and second gas mixtures; and a deceleration sensor in communication with the explosive device, wherein upon sensing sufficient deceleration, said deceleration sensor ignites the explosive device, thereby causing the first and second gas mixtures to flow into the main conduit and ignite.

28. The apparatus of claim 27 wherein said closure assembly comprises a first burster plate disposed between the first receptacle and the main conduit, and a second burster plate disposed between the second receptacle and the main conduit; and wherein the explosive device comprises an explosive charge that ignites when the explosive device is ignited so as to rupture the first and second burster plates, thereby placing the closure assembly in the open state.

29. The apparatus of claim 27 wherein said closure assembly includes a sliding duct assembly comprising:

a housing having first and second passages extending therethrough, said first passage being in communication with said first receptacle, and said second passage being in communication with said second receptacle;

a first member disposed in the housing and defining a first aperture, said first member being movable between a closed position, wherein the first member blocks the first passage, and an open position, wherein the first aperture is aligned with the first passage; and a second member disposed in the housing and defining a second aperture, said second member being movable between a closed position, wherein the second member blocks the second passage, and an open position, wherein the second aperture is aligned with the second passage.

30. The apparatus of claim 29 wherein the explosive device comprises an explosive charge that ignites when the explosive device is ignited so as to move the first and second slidable members to the open positions, thereby placing the closure assembly in the open state.

31. The apparatus of claim 30 wherein the explosive device further comprises:

a priming wire having a first end in electrical association with the explosive charge and a second end for placement inside the flexible container; and wherein the ignition of the explosive charge ignites the priming wire, which ignites the first and second gas mixtures.

\* \* \* \* \*

UNITED STATES PATENT AND TRADEMARK OFFICE
CERTIFICATE OF CORRECTION

PATENT NO. : 5,820,161
DATED : October 13, 1998
INVENTOR(S) : Svensson

It is certified that error appears in the above-identified patent and that said Letters Patent is hereby corrected as shown below:

On the Title page, Section [30], please add
   --May 19, 1993 Sweden 9301730-9--.

Column 12, Line 19, Claim 22, delete "claim 27"
   and insert --claim 21--.

Signed and Sealed this

Second Day of March, 1999

Attest:

Attesting Officer

Q. TODD DICKINSON

Acting Commissioner of Patents and Trademarks